Feb. 26, 1924.
J. A. KAYE
1,484,889
COMBINATION TEA AND COFFEE POT
Filed Oct. 13, 1923
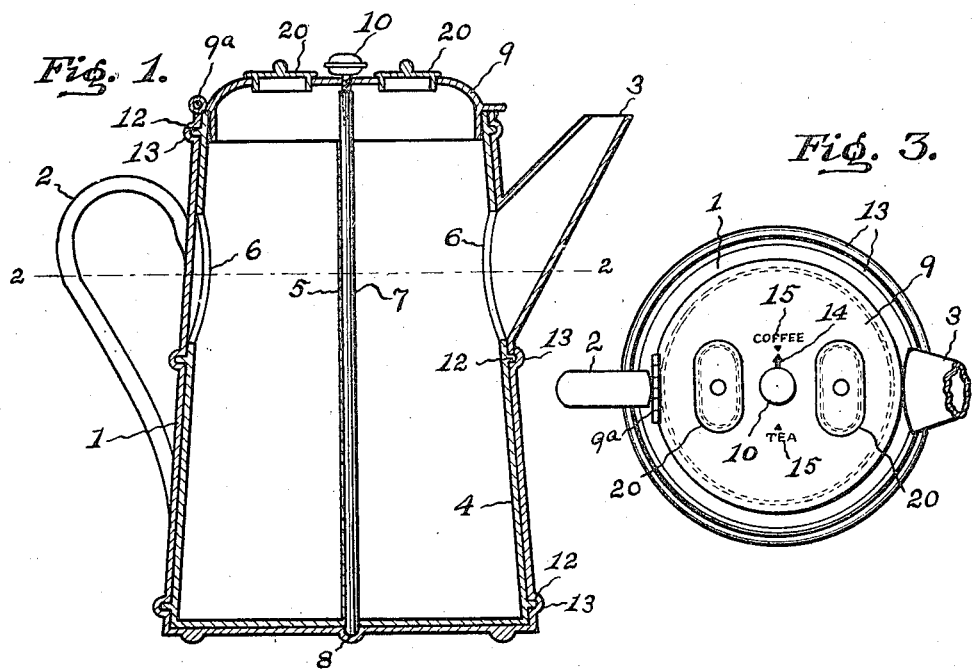
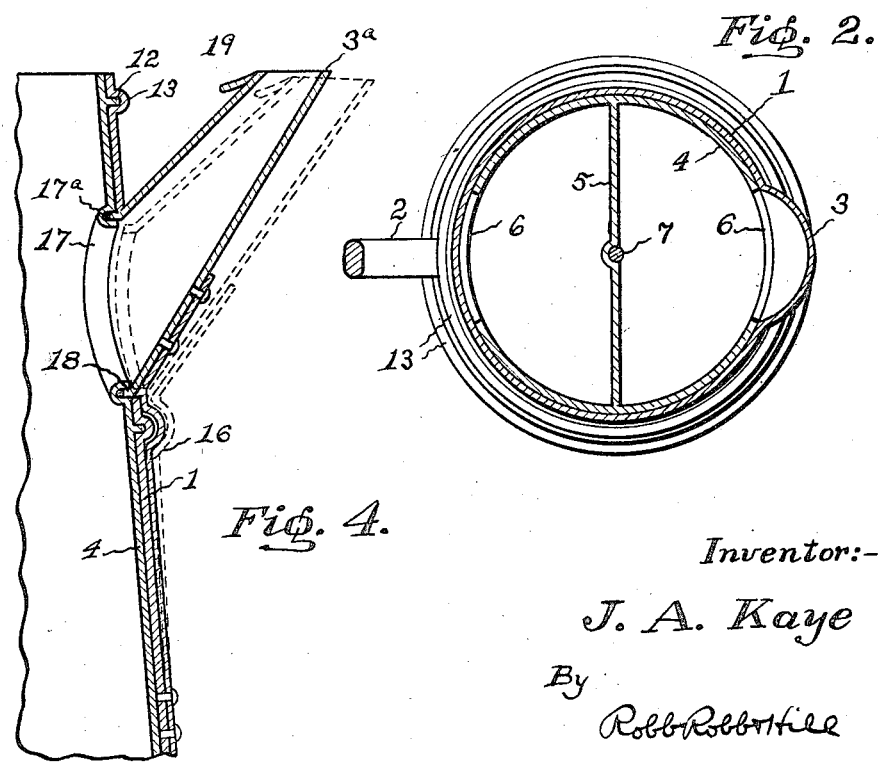
Inventor:-
J. A. Kaye
By Robb Robb & Hill Patented Feb. 26, 1924.

1,484,889

UNITED STATES PATENT OFFICE.

JOHN A. KAYE, OF SAULT STE. MARIE, ONTARIO, CANADA.

COMBINATION TEA AND COFFEE POT.

Application filed October 13, 1923. Serial No. 668,257.

*To all whom it may concern:*

Be it known that I, JOHN A. KAYE, a subject of the King of Great Britain, residing at Sault Ste. Marie, in the Province of Ontario and Dominion of Canada, have invented certain new and useful Improvements in Combination Tea and Coffee Pots, of which the following is a specification.

The present invention relates to a cooking utensil which embodies novel features of construction, whereby a number of different beverages or liquid concoctions of any kind can be made in different compartments and selectively poured through a single spout. A cooking utensil of this kind can be conveniently constructed in the form of a combination tea and coffee pot in which two beverages, such as, tea and coffee can be made at the same time and then selectively poured, as may be desired.

Among the objects of the invention are to provide a multiple compartment cooking receptacle of this character which is comparatively simple and inexpensive in its construction, which can be conveniently handled and used in the same manner as an ordinary tea or coffee pot, and which can be readily adjusted for the pouring of the contents of a selected compartment through the spout.

With the foregoing and other objects in view as will more fully appear as the description proceeds, the invention consists in certain combinations and arrangements of the parts, the novel features being pointed out in the appended claims.

For a full understanding of the invention reference is to be had to the following description and accompanying drawings, in which—

Figure 1 is a vertical sectional view through a combined tea and coffee pot which is constructed in accordance with the invention.

Figure 2 is a transverse sectional view taken on the line 2—2 of Figure 1.

Figure 3 is a top plan view of the knob for turning the interior receptacle and a portion of the cover which is associated therewith.

Figure 4 is a fragmentary sectional view through a modified form of the invention, the position assumed by the spout when it is sprung outwardly to permit rotation of the inner vessel being indicated by dotted lines.

Corresponding and like parts are referred to in the following description and indicated on all of the views of the drawings by like reference characters.

Referring to the drawings which illustrate one of many possible embodiments of the invention, the numeral 1 designates the outer shell or casing which is circular in cross section and may be either cylindrical or tapered in form. The outer shell 1 is provided at one side thereof with a handle 2 and at the opposite side thereof with a pouring spout 3, the said pouring spout being preferably attached to the shell 1 at a point toward the top thereof.

Arranged within the outer shell 1 is an inner receptacle 4 which is subdivided by a vertical partition 5 into a pair of separate compartments. The receptacle 4 corresponds in size and shape with the outer shell 1 and fits snugly within the same, being rotatable therein so that either one of the compartments can be brought into operative relation with the turning spout.

The side wall of the inner receptacle 4 is provided with openings 6 which communicate with the respective compartments, either one of which is adapted to be rotated into registry with the pouring spout 3 when it is desired to pour the contents of the corresponding compartment from the utensil.

A central rod 7 extends axially through the inner receptacle, being shown as in engagement with the partition 5. The lower end of the rod extends through the bottom of the inner receptacle and engages a bearing 8 in the bottom of the outer shell 1. The upper end of the rod extends through a central opening in a cover 9 and has a knob 10 removably applied thereto. This knob may have a threaded attachment with the rod, as indicated at 11, and provides a means for rotating the rod and inner receptacle 4 for the purpose of bringing the inner receptacle into position for pouring the contents of either of the separate compartments through the spout. The knob 10 serves to hold the cover 9 in a closed position, although the cover can be removed or opened after the knob has been removed.

In order to prevent leakage of the liquid contents of the receptacle between the walls of the receptacle and outer shell, the inner receptacle is provided with a series of outwardly projecting annular ribs or flanges 12 which fit within corresponding seats or grooves 13 in the outer shell. These ribs 12 turn freely in the seats 13 when the inner receptacle is rotated and tend to prevent the passage of the liquid contents of the utensil between the outer and inner walls. In the combined tea and coffee pot shown by the drawings there are three of the annular ribs 12, said ribs being located at the top and bottom respectively of the inner receptacle and also just below the openings 6 in the sides thereof.

In the use of the utensil, tea and coffee or any desired beverage or liquid substances can be simultaneously prepared in the separate compartments of the inner receptacle 4. When it is desired to pour out the contents of one of the receptacles the knob 10 is rotated to turn the inner receptacle 4 into such a position that the opening 6 thereof is in registry with the pouring spout 3. In order to facilitate the proper positioning of the inner receptacle 4, the knob 10 may be provided with a pointer 14 and the top of the cover 9 may have appropriate marks 15 thereon for cooperation with the pointer to enable the operator to bring either desired compartment into proper position for pouring the contents thereof through the spout.

A modification is shown by Fig. 4 in which additional provision is made for preventing leakage of the liquid contents of the receptacle at the base of the spout during the pouring operation. In this figure the spout $3^a$ is separable from the outer shell, being carried by a comparatively stiff spring arm 16 which extends downwardly from the spout along the side of the outer shell and is secured thereto at its lower end. The spout can thus be moved forcibly away from the outer shell 1 by flexing the spring arm, although it will return to its original position as soon as it is released.

Each of the openings 6 is surrounded by an outwardly opening grooved seat 17, which may be conveniently formed by crimping the sheet metal at the edges of the opening. The mouth of the grooved seat is thus flush with the exterior of the inner receptacle 4, so that the inner receptacle fits snugly within the outer shell and there is no interference with the rotation thereof when the spout is flexed outwardly. The base or inner end of the spout is formed with an inwardly projecting flange 18 which is adapted to engage the grooved seat 17 when the parts are in proper position for pouring out the contents of one of the compartments. When the spout $3^a$ is flexed outwardly away from the outer shell 1 the flange 18 at the base thereof is disengaged from the inner receptacle 4, so that the latter can be turned freely to bring either compartment thereof into position for turning. After the inner receptacle has been rotated into proper position the spout $3^a$ is released, whereupon the resiliency of the spring arm 16 returns it to its original position and causes the flange 18 at the base thereof to be received in the grooved seat 17. A tight joint is thus provided between the inner receptacle and the spout, so that the possibility of leakage at the base of the spout is practically eliminated. Packing $17^a$ may be provided in the base of the seat 17 if desired.

For convenience in moving the spout $3^a$ into inoperative position when rotating the inner receptacle 4, the end of the spout may be provided with a finger piece 19. Pressure is applied to the finger piece to hold the spout in inoperative position while the inner receptacle is being rotated.

The cover 9 may, if desired, be hingedly connected to the outer shell, as indicated at $9^a$, and it is held in a closed position by the knob 10 when the latter is screwed into the upper end of the central rod 7. When the knob is unscrewed and removed, however, the cover can be readily swung upwardly into an open position, so that access can be simultaneously had to all of the several compartments of the inner receptacle.

The cover may be provided with a series of individual openings having an arrangement to correspond with the separate compartments of the inner receptacle. These individual openings may be conveniently closed by the small lids or covers 20, although by removing any one of the lids access can be had to one of the compartments for the purpose of filling the same with water or placing coffee, tea or the like therein. The several interior compartments can thus be filled with water and supplied with tea or the like as desired.

While certain embodiments of the invention have been illustrated and described in detail for illustrative purposes, it will be understood that many modifications and changes can be made in the details of construction without departing from the spirit and scope of the claims.

Having thus described my invention what I claim as new and desire to secure by Letters Patent of the United States is,

1. A multiple compartment cooking utensil including an outer shell provided with a pouring spout, an inner receptacle rotatable within the outer shell and subdivided into a plurality of compartments, the side walls of each compartment being provided with an opening adapted to be rotated into registry with the pouring spout, means to rotate the inner receptacle, and means to prevent the flow of liquids between the walls of the outer shell and inner receptacle.

2. A multiple compartment cooking utensil including an outer shell provided with a pouring spout, an inner receptacle rotatable within the outer shell and subdivided into a plurality of compartments, the side walls of the compartments being provided with openings adapted to be rotated into registry with the pouring spout, means for rotating the inner receptacle, and corresponding annular flanges and seats on the outer shell and inner receptacle to prevent the flow of liquids between the same.

3. A multiple compartment cooking utensil including an outer shell provided with a pouring spout, an inner receptacle rotatable within the outer shell and subdivided into a plurality of compartments, the side walls of the compartments being formed with openings adapted to be rotated into registry with the pouring spout, means for rotating the inner receptacle, and a series of outstanding annular flanges on the inner receptacle, the outer shell being formed with annular seats which receive the said flanges and cooperate therewith to prevent the free flow of liquid between the members.

4. A multiple compartment cooking utensil including an outer shell having a bearing in the bottom thereof and provided with a pouring spout, an inner receptacle rotatable within the outer shell and subdivided into a plurality of compartments, the side walls of the inner receptacle being provided with openings adapted to be rotated into engagement with the pouring spout, a central rod carried by the inner receptacle and having the lower end thereof in engagement with the before mentioned bearing, and means at the upper end of the rod for rotating the inner receptacle.

5. A multiple compartment cooking utensil including an outer shell provided with a pouring spout, an inner receptacle rotatable within the outer shell and subdivided into a plurality of compartments, the said compartments being provided with openings which are adapted to be rotated into registry with the pouring spout, a cover for the outer shell, and means engaging the cover to hold it in a closed position and also operatively connected to the inner receptacle for rotating the same.

6. A multiple compartment cooking utensil including an outer shell provided with a pouring spout, an inner receptacle rotatable within the outer shell and subdivided into a plurality of compartments having openings in the walls thereof which are adapted to be rotated into registry with the pouring spout, a cover for the outer shell, and a turning knob having a stem which extends through the cover and detachably engages the inner receptacle for rotating the same, said knob also serving to hold the cover in position.

7. A multiple compartment cooking utensil including an outer shell provided with a pouring spout, an inner receptacle rotatable within the outer shell and formed with a plurality of compartments having openings in the walls thereof which are adapted to be rotated into registry with the pouring spout, a cover for the outer shell, a knob formed with a stem which extends through the cover and is operatively connected to the inner receptacle for rotating the same, and a pointer on the knob, the cover being provided with suitable indicia for cooperation with the pointer to indicate the position of the inner receptacle.

8. A multiple compartment cooking utensil including an outer shell provided with a pouring spout, an inner receptacle rotatable within the outer shell and subdivided into a plurality of compartments of which any one can be rotated into communication with the spout, a cover for the outer shell, said cover being provided with a series of openings having an arrangement corresponding to the arrangement of the compartments, and a turning knob extending through the cover and operatively connected to the inner receptacle.

9. A multiple compartment cooking utensil including an outer shell formed with a side opening, an inner receptacle within the outer shell and having an opening corresponding to the opening therein, and a pouring spout movable through the opening of the outer shell into engagement with the inner receptacle.

10. A multiple compartment cooking utensil including an outer shell formed with a side opening, an inner receptacle arranged within the outer shell and formed with an opening corresponding to the opening of the outer shell, a spout movable through the opening of the outer shell into engagement with the edges of the opening in the inner receptacle, and means for holding the spout in operative position.

11. A multiple compartment cooking utensil including an outer shell having a side opening therein, an inner receptacle arranged within the outer shell and formed with an opening corresponding with the opening of the outer shell, a spout movable through the opening of the outer shell into engagement with the inner receptacle, means for producing a detachable joint between the spout and the edges of the opening of the inner receptacle, and means for holding the spout in operative position.

12. A multiple compartment cooking utensil including an outer shell formed with a side opening, an inner receptacle arranged within the outer shell and formed with an opening corresponding to the opening of the outer shell, the opening of the inner receptacle being surrounded by a seat, a spout movable through the opening of the outer shell into engagement with the inner receptacle and formed with a flange adapted to interlock with the said seat, and means for holding the spout in operative position.

In testimony whereof I affix my signature.

JOHN A. KAYE.